US008122452B2

(12) United States Patent
Jelinek et al.

(10) Patent No.: US 8,122,452 B2
(45) Date of Patent: Feb. 21, 2012

(54) SWAP CAP RESOURCE CONTROL FOR USE IN VIRTUALIZATION

(75) Inventors: Gerald A. Jelinek, Colorado Springs, CO (US); Daniel B. Price, Menlo Park, CA (US); David S. Comay, San Ramon, CA (US); Stephen Frances Lawrence, Newark, CA (US)

(73) Assignee: Oracle America, Inc., Redwood City, CA (US)

( * ) Notice: Subject to any disclaimer, the term of this patent is extended or adjusted under 35 U.S.C. 154(b) by 1271 days.

(21) Appl. No.: 11/771,079

(22) Filed: Jun. 29, 2007

(65) Prior Publication Data

US 2009/0007126 A1   Jan. 1, 2009

(51) Int. Cl.
  *G06F 9/46*   (2006.01)
  *G06F 9/455*   (2006.01)
(52) U.S. Cl. .......................................... 718/104; 718/1
(58) Field of Classification Search ........................ None
  See application file for complete search history.

(56) References Cited

U.S. PATENT DOCUMENTS

| 7,136,981 | B2 * | 11/2006 | Burch et al. | 711/170 |
| 7,158,972 | B2 * | 1/2007 | Marsland | 1/1 |
| 7,376,738 | B2 * | 5/2008 | Snyder | 709/226 |
| 7,693,983 | B1 * | 4/2010 | Gupta et al. | 709/224 |
| 7,810,083 | B2 * | 10/2010 | Chinya et al. | 717/149 |
| 2008/0092138 | A1 * | 4/2008 | Chung et al. | 718/100 |

OTHER PUBLICATIONS

Joost Pronk van Hoogeveen and Paul Steeves, Solaris Software, "SOLARIS 10 How to Guides: Consolidating Servers and Applications with SOLARIS Containers," 2005, Sun Microsystems, Inc., Santa Clara, California.
"System Administration Guide: Solaris Containers-Resource Management and Solaris Zones," Part No. 817-1592, 2006, Sun Microsystems, Inc., Santa Clara, California.

* cited by examiner

*Primary Examiner* — Camquy Truong
(74) *Attorney, Agent, or Firm* — Brooks Kushman P.C.

(57) ABSTRACT

A method of implementing virtualization involves an improved approach to virtual memory management. An operating system includes a kernel, a resource control framework, a virtual memory subsystem, and a virtualization subsystem. The virtualization subsystem is capable of creating separate environments that logically isolate applications from each other. The virtual memory subsystem utilizes swap space to manage a backing store for anonymous memory. The separate environments share physical resources including swap space. When a separate environment is configured, properties are defined. Configuring a separate environment may include specifying a swap cap that specifies a maximum amount of swap space usable by the separate environment. The resource control framework includes a swap cap resource control. The swap cap resource control is enforced by the kernel such that during operation of the separate environment, the kernel enforces the swap cap specified when the separate environment was configured.

4 Claims, 6 Drawing Sheets

SWAP CAP RESOURCE CONTROL FOR USE IN VIRTUALIZATION

BACKGROUND OF THE INVENTION

1. Field of the Invention

The invention relates to virtualization techniques and to resource management.

2. Background Art

A server computer, workstation, desktop computer, or any other computing platform has a plurality of physical resources that are used to provide services. These physical resources may include, for example, processors, memory, and other hardware resources. The computing platform uses the available physical resources to handle a plurality of workloads. In general, a workload is a set of related processes. Resource management is the controlling of resources and the allocation of resources among workloads on the computing platform.

One existing approach to resource management is implemented in the SOLARIS operating system from Sun Microsystems, Inc., Santa Clara, Calif. One way that the SOLARIS operating system manages resources is by using the concepts of projects, tasks, and resource controls.

The project and task entities are used to describe workloads. A task is a group of processes. A task is associated with a project. A project may include multiple tasks. The system maintains a project database. The project database maintains information about the projects on the system. Among other information, the entry for a particular project in the project database may include one or more project attributes. Project attributes may be used to set values for resource controls.

The SOLARIS operating system implements a resource control framework to implement resource controls. The resource control framework manages resource controls on processes, tasks, and projects. These resource controls are enforced by the kernel. Further, the resource control framework leverages the project database such that resource controls for a process, task, or project may be set in the project database. The existing implementation of the resource control framework may be leveraged by various SOLARIS operating system facilities. In general, the SOLARIS operating system resource control framework provides advanced, kernel-enforced resource control capabilities in a known fashion.

Another way that the SOLARIS operating system manages resources is with SOLARIS Containers, which is an operating system virtualization technique. The use of virtualization is increasing. In general, virtualization relates to creating an abstraction layer between software applications and physical resources. There are many approaches to virtualization.

SOLARIS Containers includes several different technologies that are used together to consolidate servers and applications. With server virtualization, applications can be consolidated onto a fewer number of servers. For example, multiple virtual servers may exist on a single physical server.

The SOLARIS Containers approach to implementing virtualization involves a technology referred to as SOLARIS zones and a technology referred to as SOLARIS resource pools. Zones are separate environments on a machine that logically isolate applications from each other. Each application receives a dedicated namespace. Put another way, a zone is a type of sandbox. A resource pool is a set of physical resources such as, for example, processors. The SOLARIS pools facility is used to partition the system resources into a plurality of resource pools for the purposes of resource management. The SOLARIS zones facility is for virtualizing the operating system to improve security, provide isolation and administrative delegation.

When consolidating applications with SOLARIS Containers, physical resources are partitioned into a number of resource pools. A zone may be created for each application, and then one or more zones are assigned to each resource pool.

Another technology involved in SOLARIS Containers is called the Fair Share Scheduler (FSS). The Fair Share Scheduler is used when multiple zones are assigned to the same resource pool. The scheduler software enables resources in a resource pool to be allocated proportionally to applications, that is, to the zones that share the same resource pool.

In an existing implementation of SOLARIS Containers, the pools facility is static. That is, the pool configurations must be defined in advance. However, SOLARIS zones are dynamic. There can be many zones defined; the zones may not all be running at a particular time. Zones can be rebooted or even moved to a new host.

In the SOLARIS Containers approach to virtualization, zones and resource pools provide application containment. Within an application container, the application believes that it is running on its own server; however, the kernel and a number of system libraries are shared between the various containers. As well, the physical resources are shared in accordance with the configured resource pools.

FIGS. 1-3 illustrate an existing implementation of SOLARIS Containers, showing how virtualization allows multiple applications and servers to be consolidated onto a single physical server using application containers composed of zones and resource pools. As shown in FIG. 1, a single physical server 10, using server virtualization, allows the consolidation of an email application 12, a first web server 14, and a second web server 16. The single physical server 10 includes multiple virtual servers such that, after consolidation, each of the email application, first web server, and second web server exists on its own virtual server on server 10.

As best shown in FIG. 2, in order to create the application containers, each application has its own zone 22, 24, and 26. FIG. 3 illustrates the completed example including first and second resource pools 30 and 32, respectively. Zones 22, 24, and 26 are non-global zones; the global zone is indicated at 34. Global zone 34 is the original SOLARIS operating system instance.

With continuing reference to FIG. 3, zone 22 has a dedicated resource pool, pool 32. Zone 24, zone 26, and the global zone 34 share resource pool 30. The Fair Share Scheduler (FSS) proportionally allocates resources to zone 24, zone 26, and global zone 34 in accordance with assigned numbers of shares.

As shown, there are four application containers. The first container is composed of zone 22 and resource pool 32. The second container is composed of zone 24 and resource pool 30. The third container is composed of zone 26 and resource pool 30. The fourth container is composed of global zone 34 and resource pool 30.

Background information relating to SOLARIS Containers technology may be found in Joost Pronk van Hoogeveen and Paul Steeves, Solaris Software, "SOLARIS 10 How To Guides: Consolidating Servers and Applications with SOLARIS Containers," 2005, Sun Microsystems, Inc., Santa Clara, Calif.

Further background information may be found in "System Administration Guide: Solaris Containers-Resource Management and Solaris Zones," Part No.: 817-1592, 2006, Sun Microsystems, Inc., Santa Clara, Calif.

Another existing approach to virtualization involves what are referred to as virtual machines. In this approach to virtualization, software running on the host operating system (or in some cases below the host operating system) allows one or more guest operating systems to run on top of the same physical hardware at the same time. In this approach, the guest operating system is a full operating system, including the kernel and libraries.

Further, in an existing implementation of the SOLARIS operating system, a virtual memory subsystem implements virtual memory management. A virtual memory system, among other benefits, may provide a larger memory size than the size of available physical memory. Disk storage is used to hold information that does not fit in the available physical memory. In the SOLARIS operating system, swap space is a SOLARIS virtual memory concept used to manage a backing store for anonymous memory. In SOLARIS, swap space is implemented such that available swap space on a physical system includes space from swap devices, such as disks, as well as a portion of physical memory. With the SOLARIS zones virtualization feature, workloads from different systems can be combined onto a single machine. It is possible for one zone to either accidentally or deliberately consume all of the swap space on the single machine, thereby negatively impacting the rest of the system.

For the foregoing reasons, there is a need for an improved approach to virtual memory management for use in virtualization.

SUMMARY OF INVENTION

It is an object of the invention to provide an improved approach to virtual memory management for use in virtualization.

In accordance with the invention, a method of implementing virtualization on a physical server is provided. The physical server includes a plurality of physical resources and an operating system including a kernel. The operating system further includes a resource control framework, a virtual memory subsystem, and a virtualization subsystem. The resource control framework implements resource controls. The virtual memory subsystem implements virtual memory management. The virtualization subsystem is capable of creating separate environments on the physical server that logically isolate applications from each other. The virtual memory subsystem utilizes swap space to manage a backing store for anonymous memory. The separate environments share physical resources including swap space.

The method comprises configuring a separate environment by defining properties of the separate environment. Configuring the separate environment includes specifying a swap cap that specifies a maximum amount of swap space usable by the separate environment. The resource control framework includes a swap cap resource control that is enforced by the kernel. During operation of the separate environment, the kernel enforces the swap cap specified when the separate environment was configured.

Further, in a preferred implementation of the invention, upon receipt by the kernel of a system call from a process running in the separate environment, if the system call needs to allocate more swap space, the kernel only allows the allocation of swap space when the total swap space consumed by the separate environment is less than the swap cap specified when the separate environment was configured. In the event that the allocation of swap space is not allowed due to the swap cap, an error number indicating that available swap space is insufficient is returned. In this way, the swap cap is transparent to processes running in the separate environment. In other words, the error number returned when the kernel enforces the cap is the same error number that would have been returned in the absence of a swap cap if available swap space was insufficient.

Further, in the preferred implementation of the invention, the swap cap resource control is enforced by the kernel against temporary file systems (that is, file systems that exist entirely in virtual memory). Upon receipt by the kernel of a write to a temporary file system for the separate environment that exists in swap space, the kernel only allows the allocation of swap space when the total swap space consumed by the separate environment is less than the swap cap specified when the separate environment was configured.

The separate environment may be a virtual operating system. During operation of the virtual operating system, the kernel enforces the swap cap specified when the virtual operating system was configured. Alternatively, the separate environment may be a virtual machine. In the case of a virtual machine, the kernel enforces the swap cap specified when the virtual machine was configured. Further, it is to be appreciated that virtual operating systems and virtual machines are merely examples of virtualization implementations that may be configured with swap caps that are enforced by the kernel. For example, other sandbox type environments may run with swap caps that are enforced by the kernel when a sandbox starts or initializes.

In addition to methods of implementing virtualization, the invention also comprehends a computer-readable storage medium having information stored thereon for directing a computer to perform a method of implementing virtualization including per-environment swap caps that are enforced by the kernel.

In an approach to implementing virtualization involving zones such as SOLARIS Containers, the separate environments are zones that are configured and maintained by the zones subsystem. Configuring a zone may include specifying a swap cap for the zone. The SOLARIS resource control framework is enhanced to support a swap cap resource control that is enforce by the kernel. The swap caps provide a mechanism to limit swap consumption on a per-zone basis. This protects other zones from runaway memory leakers/consumers and/or temporary file system writers in a zone with the resource control configured.

There are many advantages associated with embodiments of the invention. For example, separate environments may share physical resources including swap space, and these separate environments may be configured with specified swap caps that are enforced by the kernel. In the case of zones, a capped zone avoids the potential negative impact on the rest of the system that sometimes occurs with conventional, uncapped zones.

DETAILED DESCRIPTION OF THE PREFERRED EMBODIMENT

The preferred embodiment of the invention enhances SOLARIS Containers in the SOLARIS operating system. In more detail, zones may be configured with specified swap caps that are enforced by the kernel. Of course, it is to be appreciated that enhancing SOLARIS Containers is one embodiment of the invention; embodiments of the invention may be implemented in other virtualization implementations such as implementations involving virtual machines or any other sandbox-like environments.

Figure 1:
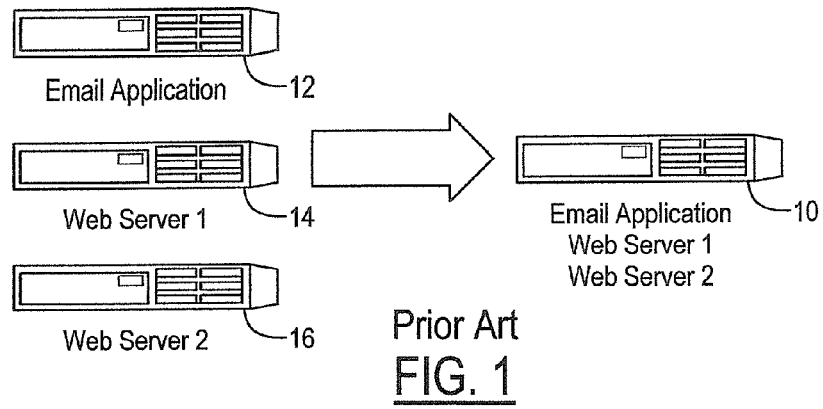
FIG. 1-3 illustrate an example of server virtualization in an existing implementation of SOLARIS Containers.
Figure 2:
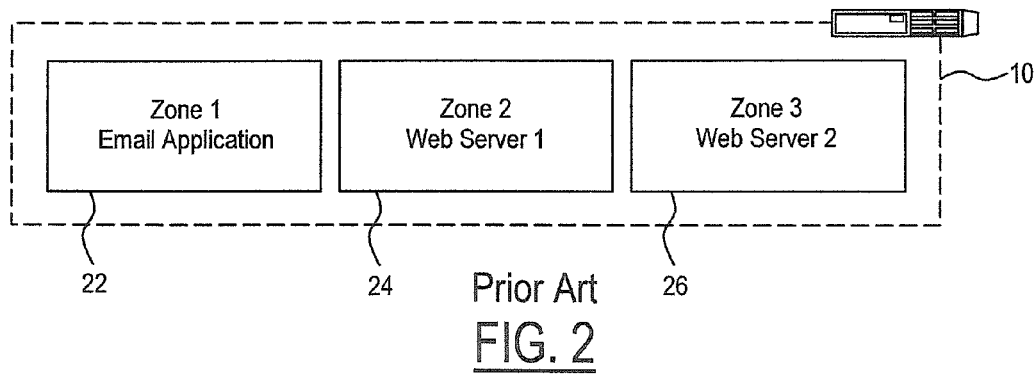
Figure 3:
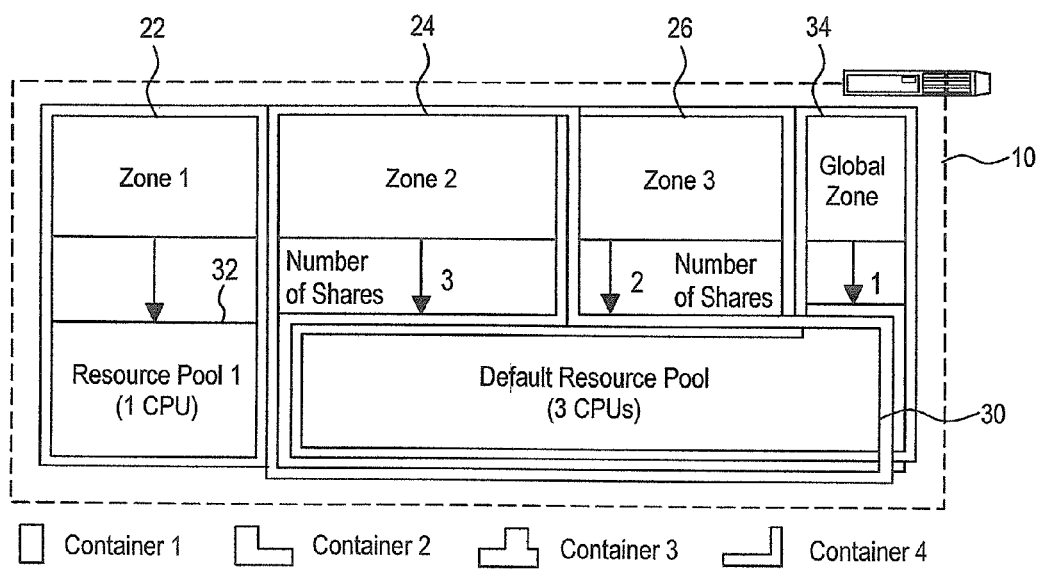
Figure 4:
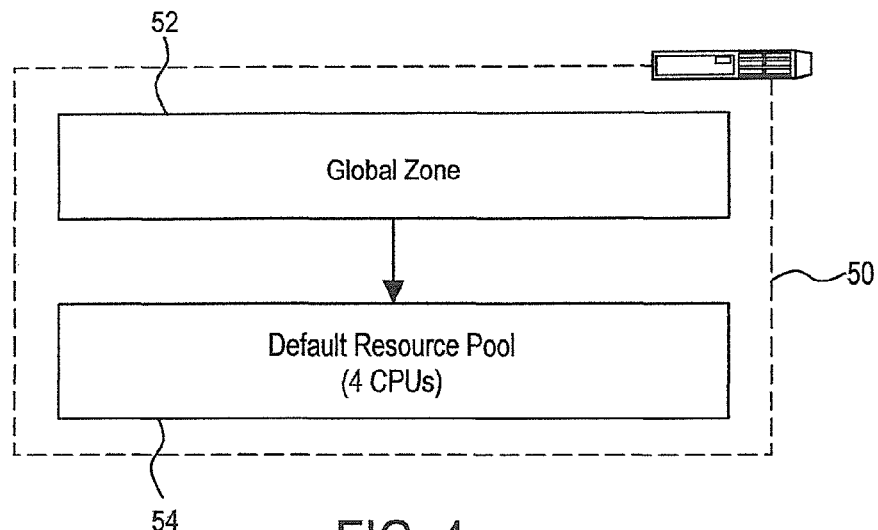
FIG. 4 illustrates a system, in the preferred embodiment of the invention, prior to any configuration.

FIGS. 4-10 illustrate a step-by-step example of server and application consolidation in the preferred embodiment of the invention, which is implemented as an enhancement to SOLARIS Containers in the SOLARIS operating system. FIG. 4 illustrates a system 50 prior to any configuration. System 50 initially has only the global zone 52 as non-global zones have not yet been configured. System 50 includes a single, default resource pool 54 consisting of four processors.

Figure 5:
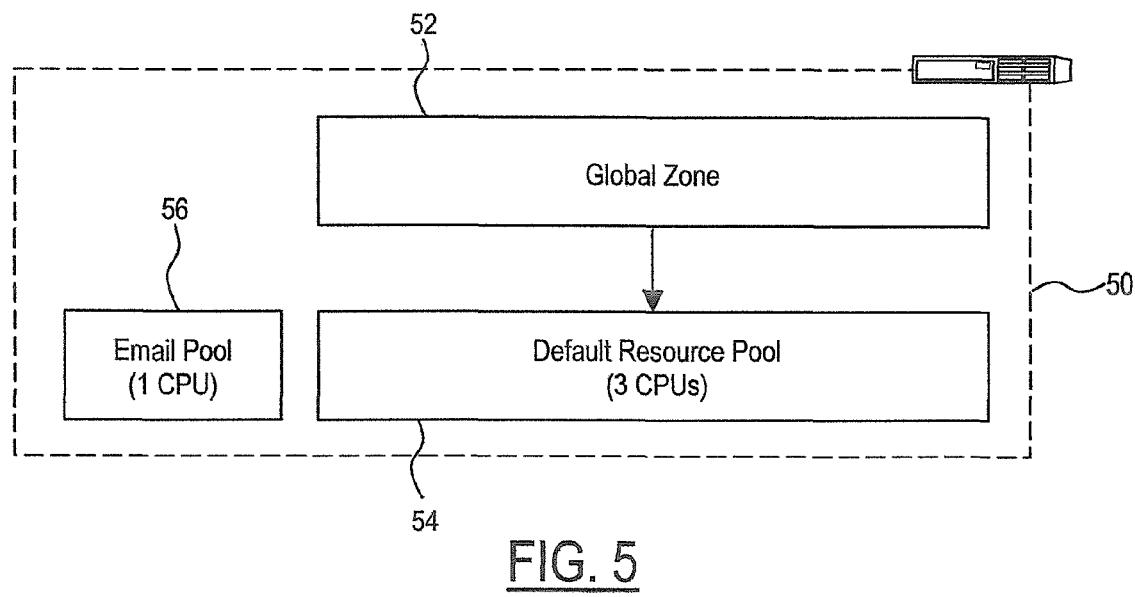
FIG. 5 illustrates the system after the creation of a resource pool for an email application.

FIG. 5 illustrates the system 50 with a resource pool 56 created with the SOLARIS pools facility. Resource pool 56 is composed of a single processor that has been removed from the default resource pool 54 and allocated to resource pool 56. Resource pool 56 is being created to provide dedicated resources for an email application. In more detail, a resource pool is a logical entity that owns a subset of the system resources. These subsets are known as resource sets. In this example, the resource set is a processor set. In order to create resource pool 56, a processor set is defined, in this case, as including a single processor. Resource pool 56 is then created and the processor set including the single processor is added to resource pool 56, resulting in the configuration shown in FIG. 5. This process for creating a resource pool may take place in a known fashion as provided by the pools facility in the SOLARIS operating system, as understood by one of ordinary skill in the art.

Figure 6:
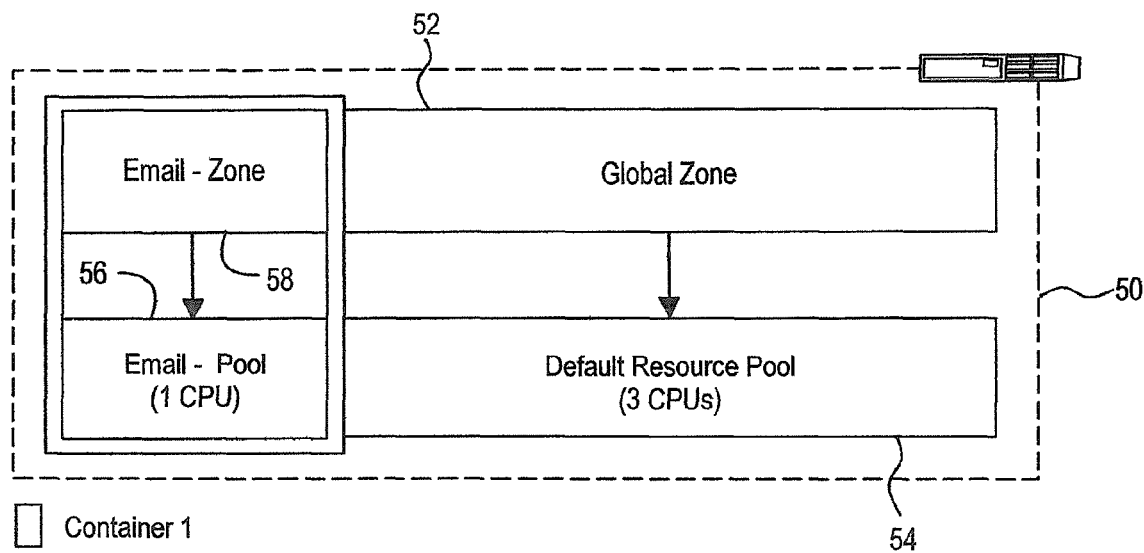
FIG. 6 illustrates the system after the configuration, installation, and booting of a zone for the email application.

FIG. 6 illustrates the system 50 after the next step, with a zone 58 for the email application having been configured, installed, and booted. The zone 58 and the resource pool 56 for the email application compose a container for the email application. In more detail, the zone 58 is a separate environment on the system 50 that logically isolates the email application from other applications outside of zone 58. Configuring a zone involves defining zone properties such as file systems and network interfaces, and involves designating a resource pool for the zone. In this case, the new zone 58 is assigned to resource pool 56. After the zone has been configured, installed, and is up and running, the result is the system 50 as shown in FIG. 6. The remaining three processors remain in the default resource pool 54 with the global zone 52. This process for creating a zone may take place in a known fashion as provided by the zones facility in the SOLARIS operating system, as understood by one of ordinary skill in the art.

Figure 7:
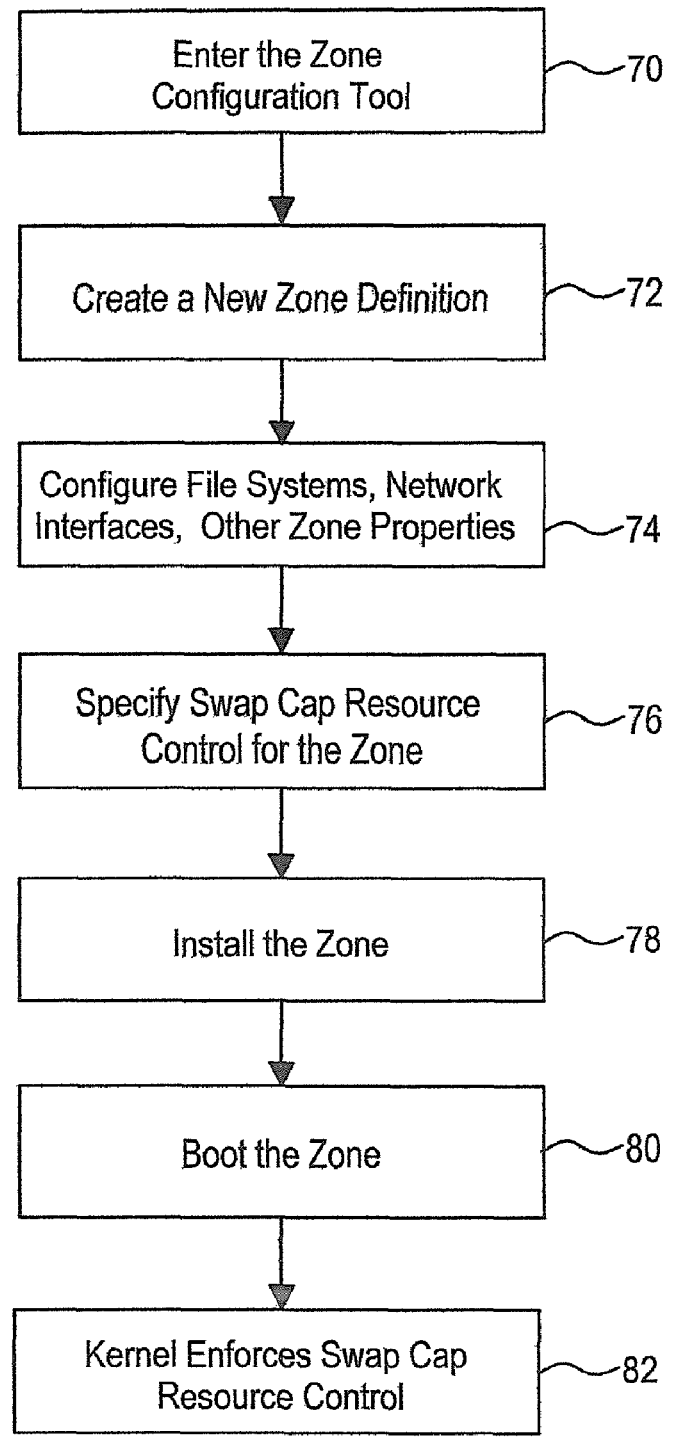
FIG. 7 illustrates the configuration, installation, and booting of a zone wherein, in accordance with the preferred embodiment of the invention, a swap cap is specified during configuration of the zone.

In accordance with the preferred embodiment of the invention, FIG. 7 illustrates the configuration, installation, and booting of a zone wherein a swap cap resource control is specified during configuration of the zone. In order to configure a new zone, the zone configuration tool is entered at block 70. A new zone definition is created at block 72. The new zone is assigned to a file system, and network parameters are configured, at block 74. Other zone properties may also be configured at block 74. In accordance with the invention, configuring the new zone further includes specifying a swap cap resource control for the new zone, as indicated at block 76. By specifying the swap cap during configuration of the new zone, some basic resource management configuration is integrated with the zone configuration.

The specified swap cap for the zone provides soft partitioning wherein swap space is shared among zones, but wherein use of swap space for a zone having a specified swap cap is capped. Swap space consumption caps for zones are implemented as resource controls that are enforced by the kernel. In more detail, the preferred embodiment of the invention enhances the SOLARIS operating system to provide a "zone.max-swap" resource control to limit swap space consumed by user process address space mappings and temporary files system mounts within a zone. Advantageously, the swap cap resource control for zones provides a mechanism to limit swap consumption per zone. This protects other zones from runaway memory leakers/consumers and/or temporary file system writers in a zone with "zone.max-swap" configured. By using an approach to capping zone swap space consumption that involves the resource control framework, administration is simplified because administration does not require configuration of resource pools and swap devices/files.

In an exemplary implementation, the specified swap cap for a zone takes the form of an unsigned decimal number with a required k, m, g, or t modifier. For example, a value of '10 m' means 10 megabytes is the swap cap. A swap cap value for a zone is used by the kernel as the maximum amount of swap space consumable by user process address space mappings and temporary file system mounts within the zone. In more detail, in the preferred embodiment of the invention, a plurality of zones share swap space with soft partitioning (that is, the per-zone swap cap resource controls) enforced by the kernel to limit swap space consumption on a per-zone basis. The soft partitioning allows the sharing of swap space among zones. For example, with a set of zones with each zone only using a portion of its swap cap, the system can be over-provisioned. This works because a well-behaved zone should not be bumping up against its swap cap, and the unused swap space is available for other zones.

The new zone may be assigned to a dedicated resource pool to, for example, provide a dedicated number of processors. The new zone could also simply use the default resource pool. In general, embodiments of the invention relate to swap capping, and other resources for the zone may be managed in any suitable way as understood by one of ordinary skill in the art. It is appreciated that although the preferred embodiment of the invention involves a plurality of zones sharing swap space with soft partitioning (that is, the per-zone swap cap resource controls) enforced by the kernel to limit swap space consumption on a per-zone basis, in the alternative, it is contemplated that a resource pool could contain a resource set in the form of a swap set. The swap set is envisioned as a partitioning of swap resources with a specified swap set dedicated to one or more zones. In more detail, a swap set would be defined as one or more swap devices and then added to a resource pool. Any number of zones could be assigned to the resource pool that contains the swap set. Accordingly, these zones are then bound to the same set of swap devices, the one or more swap devices in the resource pool. Each of these zones could be configured with its own individual swap cap resource control that functions as a swap cap within the swap set. Once the zone configuration is completed, the new zone is installed, as indicated at block 78. As indicated at block 80, the installed zone may be booted when desired. After the zone is booted, the kernel enforces the swap cap resource control, as indicated at block 82.

In the preferred embodiment of the invention, the SOLARIS kernel and resource control framework are enhanced to support the swap cap resource control. In addition, associated administrative and reporting utilities are also enhanced to support zone swap cap resource controls. In more detail, the kernel has traditionally maintained in-kernel data structures pertaining to all information the kernel needs to manage processes and schedule lightweight processes and kernel threads for execution. In the preferred embodiment of the invention, data structures are maintained pertaining to zone resource utilization and limits, including the amount of swap space reserved by a zone. The global zone will see statistics for all zones, while non-global zones should see only statistics for themselves. In more detail, the maintained information pertaining to the amount of swap space reserved by a zone includes the current quantity of swap space consumed by the zone, and includes the currently enforced swap cap.

Enhancements to the administrative and reporting utilities may include the ability to obtain statistics pertaining to a zone, including the total swap space consumed by the zone's processes and temporary file system mounts. This value will assist administrators in monitoring the swap reserved by each zone, allowing them to choose reasonable swap cap settings.

With regard to swap cap enforcement, in the preferred embodiment, swap caps are configurable on the global zone and on any non-global zones. The effect on a process in a zone reaching its swap space limit is the same as if all system swap is reserved. Upon receipt by the kernel of a system call from a process, the kernel only allows the allocation of swap space when the total swap space consumed by the zone is less than the swap cap for the zone. In the event that the allocation of swap space is not allowed due to the swap cap, an error number indicating that available swap space is insufficient is returned.

Figure 8:
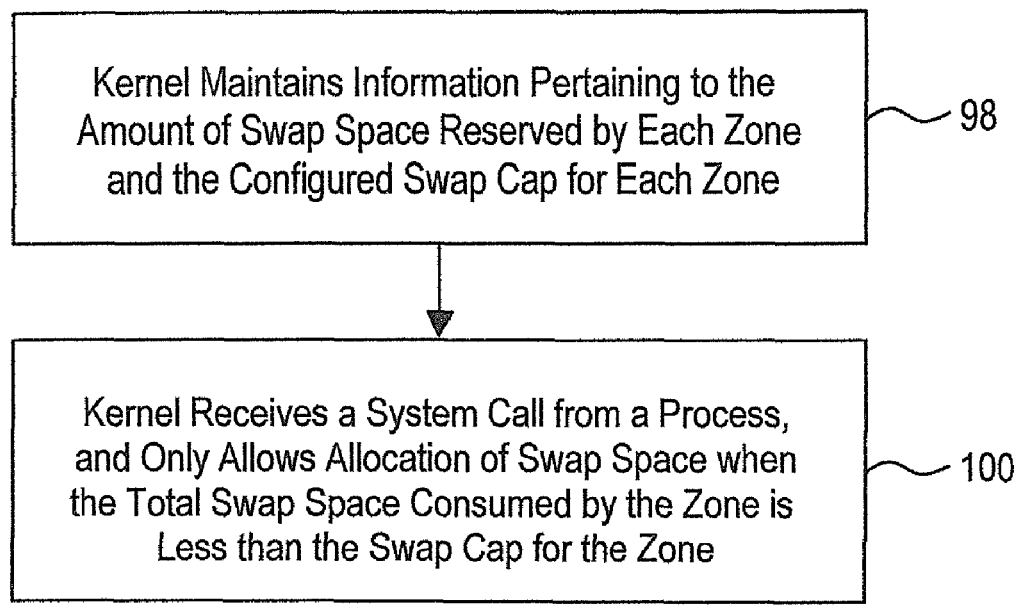
FIG. 8 illustrates enforcement of a swap cap by the kernel on a process in a zone.

FIG. 8 illustrates enforcement of a swap cap by the kernel on a process in a zone. Block 98 depicts the kernel maintaining information pertaining to the amount of swap space reserved by each zone and the configured swap cap for each zone on the system. At block 100, when the kernel receives a system call from a process, allocation of swap space is only allowed when the total swap space consumed by the zone containing the process is less than the configured swap cap for the zone. In a SOLARIS implementation, callers of mmap(2) and sbrk(2) will receive EAGAIN. Writes to temporary file systems will return ENOSPC, which is the same error number returned when a temporary file system mount reaches its "size" mount option. The "size" mount option limits the quantity of swap that a temporary file system mount can reserve. Put another way, the swap caps are transparent to applications. That is, applications do not need any modification to work correctly because, to the application, it looks just like the system ran out of swap space, even though in reality there may be free overall swap space.

Figure 9:
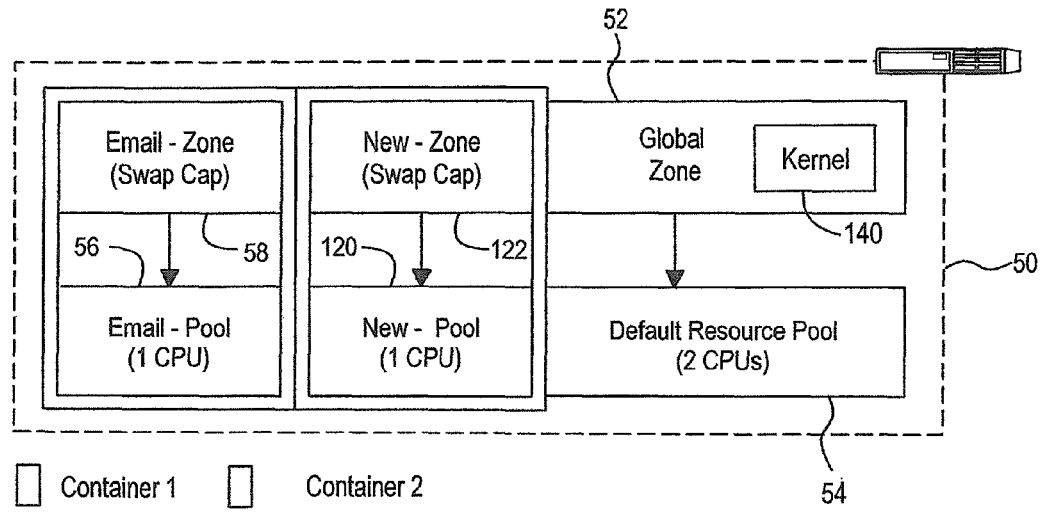
FIG. 9 illustrates the system after configuration, installation, and booting of a new zone that use a swap cap, and after the addition of a swap cap to the email application's zone.

FIG. 9 illustrates the system 50 with zone 58 for the email application having been configured and installed, and assigned to resource pool 56 as illustrated in FIG. 6; however, FIG. 9 further illustrates a new zone 122 having been configured, installed and booted wherein the new zone 122 uses a new resource pool 120. Zone 122 is configured and installed according to the method shown in FIG. 7, and the configuration for zone 122 specifies a swap cap. In FIG. 9, zone 58 for the email application has also been configured with a swap cap. The kernel 140 runs in the global zone 52 and enforces the swap cap resource controls on zones 58 and 122. More specifically, the kernel maintains data structures pertaining to zones 58 and 122, including the amount of swap space reserved by each zone and each zone's swap cap. The kernel only allows the allocation of further swap space for a zone (for example, for anonymous memory for a process or for a temporary file system) when the total swap space consumed by the zone is less than the configured swap cap for the zone.

Figure 10:
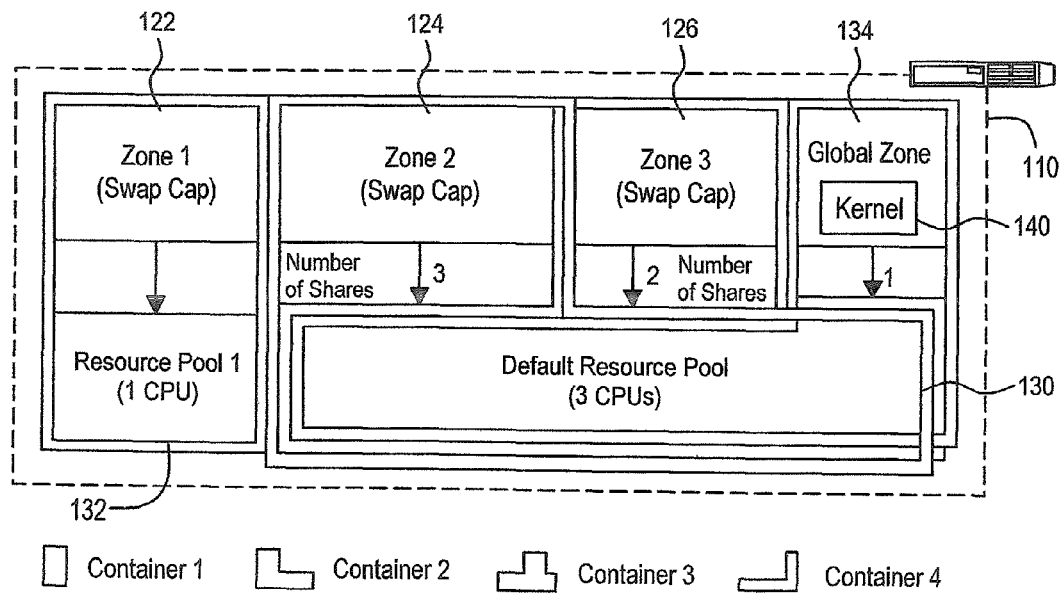
FIG. 10 illustrates an example of server virtualization using zones, with each zone being configured with a swap cap, in accordance with the preferred embodiment of the invention.

FIG. 10 illustrates an example of server virtualization using zones, with each zone being configured with a swap cap, in accordance with the preferred embodiment of the invention. In FIG. 10, the server is indicated at 110. Zone 122 has a dedicated resource pool, pool 132. Zone 124, zone 126, and the global zone 134 share resource pool 130. The Fair Share Scheduler (FSS) proportionally allocates resources to zone 124, zone 126, and global zone 134 in accordance with assigned numbers of shares.

As shown, there are four application containers. The first container is composed of zone 122 and resource pool 132. The second container is composed of zone 124 and resource pool 130. The third container is composed of zone 126 and resource pool 130. The fourth container is composed of global zone 134 and resource pool 130.

Each zone 122, 124, and 126 is configured and installed according to the method shown in FIG. 7, and the configuration for each zone 122, 124, and 126 specifies a swap cap. The kernel 140 enforces the swap caps. More specifically, the kernel only allows the allocation of further swap space for a zone when the total swap space consumed by the zone is less than the configured swap cap for the zone.

It is appreciated that the above-described preferred embodiment of the invention enhances SOLARIS Containers in the SOLARIS operating system. The invention is also applicable to other virtualization implementations wherein a physical server (physical server includes traditional server computers, workstations, desktop computers, and any other computing platforms having a plurality of physical resources that are used to provide services) includes physical resources, and wherein there is a virtualizing subsystem. Further, the separate environments that logically isolate applications from each other, zones in the preferred embodiment, may take other forms and may implement other sandbox-like environments such as virtual machines and are not limited to virtual operating systems. Put another way, embodiments of the invention may be employed in a variety of platforms to perform swap capping.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of implementing virtualization on a physical server, the physical server including:

a plurality of physical resources and an operating system including a kernel, the operating system further including a resource control framework for implementing resource controls, a virtual memory subsystem for implementing virtual memory management, and a virtualization subsystem capable of creating separate environments on the physical server that logically isolate applications from each other, the virtual memory subsystem utilizing swap space to manage a backing store for anonymous memory, and the separate environments sharing physical resources including swap space, the method comprising:

configuring a separate environment by defining properties of the separate environment, configuring the separate environment including specifying a swap cap that specifies a maximum amount of swap space usable by the separate environment; and wherein the resource control framework includes a swap cap resource control, the swap cap resource control being enforced by the kernel such that during operation of the separate environment, the kernel enforces the swap cap specified when the separate environment was configured;

wherein the separate environment is selected from the group including (i) a virtual operating system, and (ii) a virtual machine;

starting operation of the separate environment by booting the (i) virtual operating system or (ii) virtual machine;

establishing a temporary file system for the separate environment, the temporary file system existing in the swap space; and upon receipt by the kernel of a write to the temporary file system, only allowing the allocation of the swap space when the total swap space consumed by the separate environment is less than the swap cap specified when the separate environment was configured;

in the event that the allocation of the swap space is not allowed due to the swap cap, returning an error number indicating that available swap space is insufficient.

2. A non-transitory computer-readable storage medium having information stored thereon for directing a computer to perform the method of claim 1.

3. A method of implementing virtualization on a physical server, the physical server including:

a plurality of physical resources and an operating system including a kernel, the operating system further including a resource control framework for implementing resource controls, a virtual memory subsystem for implementing virtual memory management, and a virtualization subsystem capable of creating separate environments on the physical server that logically isolate applications from each other, the virtual memory subsystem utilizing swap space to manage a backing store for anonymous memory, and the separate environments sharing physical resources including swap space, the method comprising:

configuring a plurality of separate environments by defining properties of each separate environment, configuring the plurality of separate environments including, for at least one separate environment, specifying a swap cap that specifies a maximum amount of swap space usable by the separate environment; and wherein the resource control framework includes a swap cap resource control, the swap cap resource control being enforced by the kernel such that during operation of a particular separate environment, if the particular separate environment has a specified swap cap, the kernel enforces the specified swap cap;

wherein the particular separate environment is selected from the group including (i) a virtual operating system, and (ii) a virtual machine;

starting operation of the separate environment by booting the (i) virtual operating system or (ii) virtual machine;

establishing a temporary file system for the particular separate environment, the temporary file system existing in the swap space; and upon receipt by the kernel of a write to the temporary file system, only allowing the allocation of the swap space when the total swap space consumed by the particular separate environment is less than the swap cap specified when the particular separate environment was configured;

in the event that the allocation of swap space is not allowed due to the swap cap, returning an error number indicating that available swap space is insufficient.

4. A non-transitory computer-readable storage medium having information stored thereon for directing a computer to perform the method of claim 3.

* * * * *